Patented June 7, 1927.

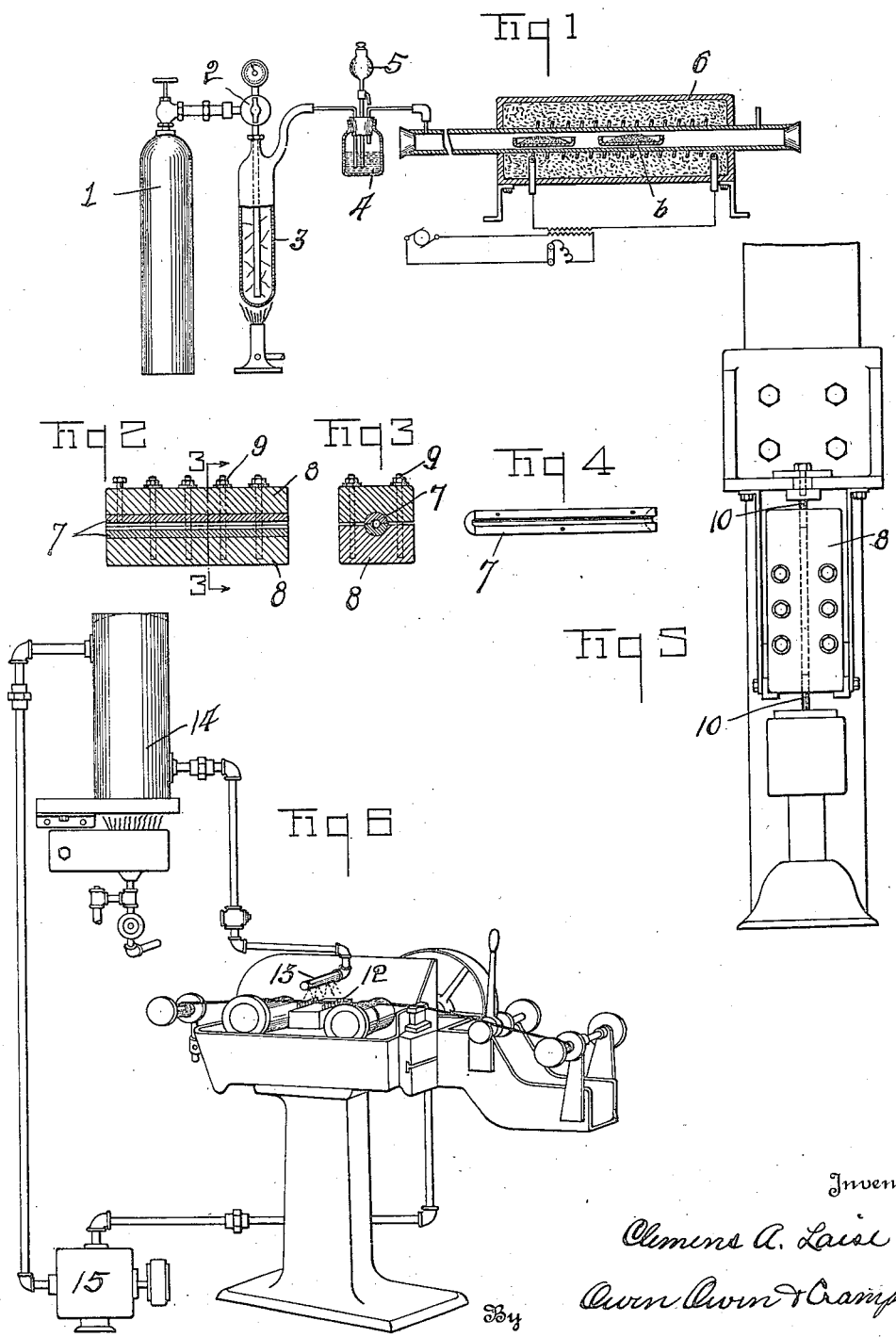

1,631,493

UNITED STATES PATENT OFFICE.

CLEMENS A. LAISE, OF TOLEDO, OHIO, ASSIGNOR TO THE ELECTRON RELAY COMPANY, OF TOLEDO, OHIO, A CORPORATION OF OHIO.

REFRACTORY METAL PRODUCT AND PROCESS OF MAKING SAME.

Application filed April 18, 1924. Serial No. 707,325.

This invention relates particularly to a filamentary body and the production thereof, and has for its primary object the production of a filament which has many advantages over the filaments heretofore used and which overcomes difficulties incident to the use thereof, as hereinafter fully described.

A. Delodyquine was among the first to describe the use of a filamentary body, employing a surface of tungsten as a light emitting medium. Alexander Just and Franz Hanaman later produced a similar filament by depositing a tungsten on a carbon filament, and this process was later refined so as to obtain a filamentary body composed of substantially pure sintered tungsten.

It is a well known fact that pure refractory metals, when heated to high temperatures, crystallize very rapidly, and, therefore, the use of a pure tungsten filament was soon abandoned due to its short life and brittle nature. In order to prevent the rapid crystallization of metallic incandescent bodies, Auer Von Welsbach suggested the addition of refractory oxides, such as thoria. This, however, has only partially overcome the objections incident to the use of tungsten as produced by Just and Hanaman and other scientists working along this line.

I have found that if refractory nitrides, instead of refractory oxides as heretofore, are added to tungsten, a very much improved filament is obtained, and that it not only produces beneficial results in retarding crystallization but also, at high temperature, generates an inert atmosphere within the lamp which retards vaporization of the metal and is beneficial to the filament.

I find that possibly the most refractory compound of boron is its nitride, which has very high melting and volatilization points, and is, therefore, particularly well suited for filamentary purposes. Furthermore, I find that if such nitride decomposes at high temperatures, such as effected by an incandescent burning of a filament, it liberates nitrogen which exerts a beneficial action on the light emitting body. I also find that my new composition of matter, consisting of boron nitride and tungsten, is much more ductile and malleable in the form of a sintered or fused bar than is the case either with pure tungsten or with tungsten mixed with a refractory oxide, and that when worked into the form of a wire or filamentary body it has a higher tensile strength, greater electrical resistance, offers greater resistance to sagging at high temperatures and retains its ductility for a longer period of time.

I further find that at low temperatures, metallic bars composed of tungsten and refractory nitrides or boron nitride, are much softer and much more malleable and ductile than tungsten, or tungsten containing a refractory oxide, and are, therefore, much easier to work mechanically by hammering, rolling or drawing, and that at the high temperatures at which the incandescent filament operates, they are much harder and, therefore, do not sag so readily and since strands of nitride are imbedded throughout the wire and act as a sort of lattice work to prevent side-slipping of crystals, as well as directing the growth of crystals in a longitudinal direction, thereby functioning so that the filamentary body embodying the invention retains its ductility for a much longer period of time than has heretofore been possible, and retards the disintegration of the filament.

It is found that the presence of nitride seems to effect other beneficial results in that if the metallic bar at sintering or fusing contains small percentages of oxides, as frequently happens, a small amount of nitride seems to be converted into boron oxide, which in turn distills out of the metal and takes along with it detrimental impurities that may be in the tungsten base, thereby producing a resultant body having a much higher degree of ductility and malleability than pure tungsten. These bars may then be worked at much lower temperatures than tungsten. In fact, such temperatures as are employed in working steel, nickel and their alloys may be used; and the wire may be drawn down on the ordinary multiple die machines with hot lubricants. Because of the softer and more ductile nature of my composition of matter, the die wear incident to working the metal and consequently the die expense is far less than is the case when manufacturing tungsten filaments such as are now known in the art. Furthermore, since the nitride, acting as a scavenger, eliminates the detrimental impurities in the tungsten, the material permits of more efficient mechanical working so that less shrinkage is produced than when working pure tungsten or tungsten containing refractory oxides.

In describing the process which I preferably employ in producing my new filamentary body or composition of matter, I will refer to the accompanying drawings which illustrate in general the different apparatus and parts which I find suitable to employ in carrying out the process.

In the drawings, Fig. 1 is an elevation partly in section of a reduction apparatus suitable for use in connection with the invention. Figures 2 and 3 are different sectional views of the molding means employed. Figure 4 is a perspective view of one of the inner mold members. Figure 5 is an elevation of a jack used in connection with the mold, and Fig. 6 is an elevation of a wire drawing apparatus.

The process herein described for convenience may be divided into three stages:

1. The preparation of a pure boron nitride powder and a suitable tungsten powder.
2. The preparation of a homogeneous coherent and adherent billet of refractory materials, and
3. A mechanical working operation whereby the billet is converted into a suitable filamentary body.

The first step in the process is the preparation of a pure boron nitride. The materials required for this are borax and ammonium chloride, of which chemicals the C. P. or U. S. P. grade may be used. The powdered ammonium chloride is placed in a large porcelain dish and dried in a large oven at about 150° C. for two hours. The chloride is then ground by ball-milling and sifted through an eighty mesh sieve.

The borax is also dehydrated by placing it in a porcelain dish and drying in an oven at a very low fire to start with, the temperature being gradually raised to about 500° C., which leaves the borax in a light fluffy condition, and permits ready grinding in a large mortar. The ground borax is then sifted to pass through an eighty mesh sieve, after which two parts of ammonium chloride are added to one part of borax, and the mixture thoroughly tumbled in a ball-mill for a period of about one hour.

This mixture is then charged into a nickel crucible, fitted with a cover, which holds about 350 grams at a charge. The crucible is heated in a crucible furnace to about 700° C. until there are no more fumes liberated, after which it is permitted to cool and the crucible then opened. After removing the contents from the crucible, the mixture is boiled for fifteen or twenty minutes in a solution consisting of one part by volume of C. P. hydrochloric acid and two parts by volume of distilled water and finally filtered through a Buechner funnel and washed many times alternately with distilled water and acid of the strength given above. The boron nitride remaining behind is finally dried by washing with wood alcohol, and is then ignited at a white heat. It is then screened through a 200 mesh sieve, and after ball-milling for about an hour is ready for use.

To produce a suitable tungsten base for the composition, I start with a tungstic acid which has been purified so that it is chemically pure tungsten oxide containing not more than .25% mineral impurities. Two thousand grams of this tungstic acid are dissolved in a mixture of 2000 C. C. of C. P. ammonium hydrate, having a specific gravity of 900, and 500 C. C. of distilled water. After stirring for one-half hour, most of the $WO_3$ is dissolved and the ammonium tungstate solution is filtered. The filtrate should have but a slight tinge of yellow color and, for convenience, this may be termed "solution A." Half of this ammonium tungstate solution is then placed in a porcelain evaporating dish and C. P. HCL is permitted to run into the same from fine constrictions with constant stirring until the solution gets turbid and very fine crystals float around in the same, or reaches a point where the solution is almost neutral. This solution is then permitted to cool for at least ten hours and the crystals allowed to settle. After washing the crystals several times, they are filtered through a Buechner funnel and dried in a nickel pan in a furnace heated to about 300° C. to 400° C. long enough for most of the ammonia to be driven off. This may be called "mixture A."

The other half of "solution A" is heated to a temperature of about 70° C. to 80° C. and slowly introduced into a vessel containing a boiling mixture of about three parts nitric acid and six parts hydrochloric acid and four parts water. A current of steam is injected into this mixture while "solution A" is being introduced, and a precipitate of $WO_3$ is obtained, which is finally removed, filtered and washed with hot distilled water, and then dried out into the form of a fine yellow powder of tungsten oxide. This may be called "mixture B." Instead of using the above "solution A" of ammonium tungstate, in some cases I prefer to precipitate the $WO_3$ from a sodium tungstate solution.

Equal portions of the crystalline "mixture A" and the amorphous "mixture B" are weighed out and the two thoroughly mixed for at least two hours in a porcelain ball-mill. This mixture may be then directly reduced, or, this mixture of oxides may be first placed in a silica dish and heated in a furnace, either gas or electric, for a period of about one hour at about 1000° C. By this means I obtain a compact more or less crystalline mass of oxides of a desirable structure, and this is screened through an eighty mesh sieve, and is then ready for reduction. This may be called "mixture C."

The mixture "C" of oxides, produced as above outlined, may now be reduced in any convenient way in a gas or electric furnace. For this purpose, a charge of the mixture "C" may be placed in a nickel boat which in turn is placed inside a tube of steel, porcelain, alundum or silica and heated from two to three hours to a temperature of about 600° to 650° C. and then for about five to six hours at a temperature of 900° C. to 950° C. while hydrogen, bubbling through aqua ammonia, is simultaneously passed through the tube at a rate of about twenty cubic feet per hour. This reduces the material and leaves it as a grey powder having a weight of about thirty to forty grams per cubic inch. The material may also be reduced in other ways, such, for example, as with carbon. I prefer, however, to use hydrogen or hydrogen bubbled through aqua ammonia for this purpose. I have found that in order to get a light sticky metal, it is essential to reduce the oxide with hydrogen bubbled through C. P. aqua ammonia and thereby produce the quality of metal essential to the production of a suitable metallic bar. This reduction takes place in an apparatus, such as shown in Fig. 1, where 1 is a cylinder of hydrogen, the gas passing through a reducing valve 2 and thence passing through a heated tube 3 containing heated copper and copper oxide to burn out organic compounds and oxygen. The hydrogen then passes through the bottle 4 containing aqua ammonia and provided with a separatory funnul 5, which permits the addition of fresh aqua ammonia from time to time as the water in the bottle 4 becomes exhausted of ammonia. The mixture of hydrogen and ammonia gas then passes through the reduction furnace 6 which may be either electrically or gas heated and contains the tungsten oxide in the boats $b$.

Having produced a substantially pure boron nitride and a suitable tungsten metal, as above described, a homogeneous mixture of the two is obtained by adding from one to five grams of boron nitride to each one hundred grams of the tungsten metal mixture, and the same is then ball-milled for several hours. Before milling, I prefer to grind the boron nitride into 10% of the tungsten metal in an agate mortar with an agate pestle so as to thoroughly incorporate the various constituents of the compounded body into each other before adding the remainder of the tungsten metal mixture.

The resultant mixture may now be converted into an adherent and coherent body by processes well known to the art, such as by compressing the mixture in a suitable mold on a hydraulic press into the form of a slug, and then baking and sintering the body in hydrogen or an inert atmosphere.

In order to produce a superior ingot or slug, I prefer to form the same according to my special process whereby I introduce about 150 grams to 200 grams of my mixture into a mold, such as shown in Figs. 2, 3 and 4. This mold is of split form, consisting of two inner pieces 7 which fit into the separate pieces of an outer block 8, the parts of which are similarly held together by bolts 9. The metal is first packed into the mold by tapping it continuously during the packing operation. The mold is then placed on a hydraulic jack, such as shown in Fig. 5, and the packed metal compressed by forcing the plungers 10 into the mold. It is preferable to have a plunger at each end of the mold, so as to get more uniform distribution of pressure. I find that pressures varying from 15 to 30 tons per square inch are the most desirable, although the amount of pressure exerted depends on the structure of the metal. After the metal has been sufficiently compressed, the pressure is released and the mold opened to permit the removal of the compressed metal therefrom. The slug that is formed, usually from 5" to 6" in length, is either heated in the inner portion of the mold, or is placed on a nickel boat and passed through an electric furnace, being heated in hydrogen, vacuum or a reducing atmosphere, at about 1100° C. for a period of about half an hour. It is then allowed to cool and removed from the furnace. If the slug contains ingredients making it desirable to heat same in vacuum, such as tantalum nitride, I prefer to cover same with powder of chromium metal which absorbs any harmful gases that may be liberated.

The resultant slug will consist of a compact, solid coherent and adherent billet having a metallic ring. This metallic bar is then further heat-treated in a tungsten tube or slat furnace, as described in my former United States Patent No. 1,470,175, until it attains the proper shrinkage and structure. It is usually necessary to apply sufficient heat in order to fuse the individual particles together, so that the final product has from 85% to 75% the volume of the original compressed slug.

This heat treatment may also be accomplished by passing an electric current through the bar in vacuum or hydrogen, or in an inert atmosphere in the usual manner, by suspending one end of the slug in a water cooled cup containing mercury, which will permit of the shrinkage of the slug. If this treatment is resorted to, an electric current equivalent to 85% to 95% of the fusing current of the bar is applied for a period of from ten to twenty minutes. This treatment must be carried out very carefully so that the resultant composite body will have a fracture composed of small grains rather than large crystals. The resultant bar, if properly prepared, shows a higher degree of ductility and malleability than either pure tungsten or tungsten dispersed with refractory oxides.

I prefer to produce a round bar instead of a square bar, such as ordinarily employed in the art, since in the case of a round bar, in the first stages of working, no unequal strains are set up as is the case with a square bar, wherein the corner portions are stressed to a greater degree than the balance of the material. For this reason, the resultant filamentary body made from a round bar has less tendency to revert to a brittle condition when the strains are released at high temperature, as is the case with a square bar.

The third phase of my process consists of so working the billet mechanically as to convert it from a bar of low ductility and malleability to one of high ductility, and finally into a suitable wire of a filamentary body. This is accomplished by first hammering the billet and then ductilizing the same by the use of the process disclosed in my said former Patent No. 1,470,175 for such purpose. In this process the metallic bar is first hammered hot, as is the case in the first stages of most metal working operations, and the hammering operation is preferably carried out on rotating swaging machines with the metal at a yellow or red heat, the bars being heated in standard muffle or small blast furnaces, the temperatures employed being much lower than those used for substantially pure tungsten bars or tungsten bars containing additions of refractory oxides. Since my bars are worked at such a low temperature, compared to their melting point, it is necessary to subject them to intermediate annealings at a temperature of about 1700° to 2000° C. after each sixth pass through the swaging machine. Reduction steps of 10% to 16%, by weight, may be taken on the swaging operations.

After the refractory metal has been hammered down to a diameter of from 40 to 35 mills. it is coiled into rings 14" to 20" in diameter and tied together with molybdenum wire. These coils are placed in an enclosed chamber or annealing furnace maintained at a temperature of red or dull red heat through which a very small flow of air is circulated. The outer surface of the wire is thereby first coated with a dense compact layer of refractory oxides and the temperature then raised slightly and subjected to a higher temperature treatment for from four to twelve hours. Through the combined action of pressure exerted by the envelope of refractory oxides and heat, the ductility and malleability of the coiled material is decidedly increased, and the body is so ductilized and softened that it may now be drawn down through steel and diamond dies. After the coils are permitted to cool, they are removed from the furnace and placed into vats containing hot concentrated caustic soda, and thereby the outward layer of the refractory oxides is dissolved leaving the inner core of ductile metal suitable for wire drawing.

The wire which at this state is about 30 to 32 mil. in diameter is first drawn through tungsten steel dies at a red heat, or even cold with intermediate annealing, to wire 12 mil. in diameter and may then be drawn to smaller diameters on standard multiple die machines, such as shown in Fig. 6. In this figure, 12 is a die holder upon which hot oil flows from jets in a nozzle 13, the oil being heated by means of a gas burner under the heater 14, the pump 15 causing a continuous circulation of the oil through the system.

When the metallic body has been drawn into wire of a diameter suitable for filamentary purposes, it is preferably subjected to a finishing operation consisting of a combined cleaning and annealing action, the wire being heated in a gas burner about 18" long, and then drawn through a bath of concentrated caustic soda solution and water. The annealing operation may also be carried on in an atmosphere of hydrogen.

The resultant product, after passing through the stages of manufacture outlined above, is a superior filamentary body which can be subjected to high temperatures without altering its structure as quickly as would be the case with substantially pure tungsten, and having a longer life at a higher efficiency. The filamentary body contains refractory nitrides which retard crystallization of the wire, and, in addition, direct the growth of the crystals in a longitudinal direction so that the wire retains its ductility longer and does not liberate detrimental oxygen such as occurs when the oxides in oxide wires dissociate at the high temperatures, but on the contrary liberates a beneficial nitrogen which aids in improving the life of a lamp in which disposed.

Furthermore, it is found that the addition of boron nitride to the tungsten produces a metallic bar that can be worked at lower temperatures than pure tungsten, and at much lower temperatures than tungsten containing refractory oxides, and that is much softer and more malleable than either of the above, thereby effecting a considerable saving in die wear when working the metal. It is also found that there is less shrinkage in my metal, thus reducing the cost of manufacture.

The starting material from which I prepare my refractory metal body contains 1% to 20%, by volume, of boron nitride and 99% and 80%, by volume, of my specially prepared tungsten powder. Since the density of boron nitride is very low, the above constitutes a weight of boron nitride ranging from .25% to 2.0%. While I have stated a range of from 1% to 20% of boron nitride in the production of my refractory metal body, I find that the best results are obtained by the use of 5% to 10% boron nitride by volume.

While I have particularly referred to the use of boron nitride in the preparation of my refractory metal body, I have found that other nitrides, among which are titanium nitride, tantalum nitride and zirconium nitride, can be used with beneficial results. I have so far, however, obtained the best results by the use of boron nitride, and I, therefore, refer to the same as the preferred nitride to use.

I have found that by the addition of small percentages of potassium borate, or potassium silicate, or other alkali compounds, not exceeding 1%, to the mixture of tungsten oxides called "mixture C" before reduction, the resultant body, after boron nitride has been added and the material worked down into a wire, is somewhat stiffer when hot and shows less sagging in coil form when burning at high temperatures than is the case if said last mentioned ingredients are omitted. The alkali metals appear to form bronzes with the tungsten, thereby exerting a beneficial action on the filament.

I have found that little of the boron nitride which is added to the composition is lost in the course of manufacturing the wire, although my method of analysis has not been perfected to such an extent as to enable me to determine the exact percentage remaining. From the results obtained, it appears that of the amount of nitride originally added, about 80% to 90%, remains in the finished wire.

It is found in practice that after a filament embodying my composition has burned a while in a lamp the crystals of the same are elongated and the boron nitride near the surface seems to dissociate the nitrogen leaving an alloy of tungsten and boron interspersed with boron nitride, or if other metallic nitrides are added an alloy of the refractory metal and tungsten interspersed with nitride.

It will be understood that while I have described herein a particular method for producing the above filamentary products, I do not wish to be limited to the precise details set forth as those skilled in the art may readily make changes therein without departing from the spirit of the invention.

Having thus described my invention, what I claim as new and desire to secure by Letters Patent is:

1. A composition of matter composed of tungsten, a refractory nitride, and alkali bronzes of tungsten.

2. A filamentary body composed primarily of tungsten and containing relatively small percentages of a refractory nitride and tungsten bronzes.

3. A filamentary body containing tungsten metal as a base and 1% to 20% of boron nitride and less than 1% of a tungsten bronze.

4. The herein described method, comprising the reduction of tungsten oxides with a mixture of hydrogen and ammonia, adding less than 20%, by volume, of a refractory nitride, to the tungsten metal, compressing, sintering and fusing the particles into a bar, and mechanically working the bar into wire.

5. The herein described method consisting in mechanically working metallic bars of tungsten or tungsten alloys containing refractory nitrides at yellow and red heats with intermediate annealings, thereby reducing size of said bars by hammering and drawing processes to about 40 mil. diameter; then heating the resultant wire in an atmosphere containing oxygen so as to form a compact coating of refractory oxide on same and further annealing said coated wire so as to produce a ductilizing effect on the metallic core; then dissolving the oxide coating in an alkaline solution and drawing the wire down to finer sizes using hot circulating lubricants on the wire during the drawing operation.

In testimony whereof I have hereunto signed my name to this specification.

CLEMENS A. LAISE.